United States Patent
Sueki et al.

(10) Patent No.: US 9,090,470 B2
(45) Date of Patent: *Jul. 28, 2015

(54) METHOD FOR PRODUCING POSITIVE ELECTRODE ACTIVE SUBSTANCE, AND USE OF SAID ACTIVE SUBSTANCE

(75) Inventors: Toshitsugu Sueki, Osaka (JP); Motoaki Nishijima, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/416,169

(22) Filed: Mar. 9, 2012

(65) Prior Publication Data

US 2012/0264016 A1    Oct. 18, 2012

(30) Foreign Application Priority Data

Apr. 18, 2011   (JP) .................................. 2011-092253

(51) Int. Cl.
*H01M 4/04* (2006.01)
*C01B 25/37* (2006.01)
(Continued)

(52) U.S. Cl.
CPC .................. *C01B 25/37* (2013.01); *C01B 25/45* (2013.01); *H01M 4/136* (2013.01);
(Continued)

(58) Field of Classification Search
CPC ............................... H01M 4/04; H01M 4/362
USPC ................................................. 429/213, 221
See application file for complete search history.

(56) References Cited

U.S. PATENT DOCUMENTS 6,085,015 A * 7/2000 Armand et al. ............... 385/140
2002/0045098 A1   4/2002 Tabuchi et al.
(Continued)

FOREIGN PATENT DOCUMENTS

CA    2 358 281 A1   4/2002
CA    2 550 496 A1   7/2005
(Continued)

OTHER PUBLICATIONS

Julien et al., Nanoscopic Scale Studies of LiFePO4 as Cathode Material in Lithium-Ion Batteries for HEV Application (Ionics (2007) 13:395-411).

(Continued)

*Primary Examiner* — Stewart Fraser
*Assistant Examiner* — Olatunji Godo
(74) *Attorney, Agent, or Firm* — Nixon & Vanderhye P.C.

(57) ABSTRACT

A method of producing a positive electrode active substance comprising steps of:
dissolving a lithium source, an M source, a phosphorus source and an X source in amounts needed to form a lithium-containing composite oxide having an olivine structure and represented by the following general formula (1):

$$Li_xM_yP_{1-z}X_zO_4 \quad (1)$$

wherein, in the formula, M is at least one kind of element selected from the group of Fe, Ni, Mn, Zr, Sn, Ti, Nb, V, Al and Y; X is at least one kind selected from the group of Si and Al; $0<x\le2$; $0.8\le y\le1.2$; and $0\le z\le1$, in a solvent being capable to dissolve these sources, thereby forming a solution;
gelating the obtained solution by adding a cyclic ether compound and
sintering the resulting gel to obtain the positive electrode active substance made of the lithium-containing composite oxide having an olivine structure that is covered with carbon deriving from the cyclic ether compound.

14 Claims, 4 Drawing Sheets

(51) Int. Cl.
| | |
|---|---|
| *H01M 4/136* | (2010.01) |
| *H01M 4/1397* | (2010.01) |
| *H01M 4/36* | (2006.01) |
| *H01M 4/505* | (2010.01) |
| *H01M 4/58* | (2010.01) |
| *H01M 4/62* | (2006.01) |
| *C01B 25/45* | (2006.01) |

(52) U.S. Cl.
CPC ........... *H01M 4/1397* (2013.01); *H01M 4/366* (2013.01); *H01M 4/505* (2013.01); *H01M 4/5825* (2013.01); *H01M 4/625* (2013.01); *C01P 2002/72* (2013.01); *C01P 2006/40* (2013.01); *Y02E 60/122* (2013.01)

(56) References Cited

U.S. PATENT DOCUMENTS

| | | | |
|---|---|---|---|
| 2003/0129496 A1* | 7/2003 | Kasai et al. | 429/231.1 |
| 2003/0170542 A1 | 9/2003 | Barker et al. | |
| 2004/0060626 A1* | 4/2004 | Tillotson et al. | 149/19.92 |
| 2005/0112054 A1 | 5/2005 | Eberman et al. | |
| 2007/0212606 A1* | 9/2007 | Chang | 429/221 |
| 2008/0138709 A1* | 6/2008 | Hatta et al. | 429/221 |
| 2010/0065787 A1* | 3/2010 | Armand et al. | 252/506 |
| 2010/0102270 A1* | 4/2010 | Jia et al. | 252/182.1 |
| 2010/0323231 A1* | 12/2010 | Sakai et al. | 429/144 |
| 2012/0070708 A1 | 3/2012 | Ohira et al. | |
| 2012/0100429 A1* | 4/2012 | Sueki et al. | 429/221 |
| 2012/0264016 A1 | 10/2012 | Sueki et al. | |
| 2013/0075673 A1* | 3/2013 | Nishijima et al. | 252/519.14 |

FOREIGN PATENT DOCUMENTS

| | | |
|---|---|---|
| CA | 2 769 207 A1 | 2/2011 |
| CN | 101219360 A | 7/2008 |
| CN | 101339994 A | 1/2009 |
| JP | 2002-198050 | 7/2002 |
| JP | 2004-014341 | 1/2004 |
| JP | 2005-519451 | 6/2005 |
| JP | 2008-311067 | 12/2008 |
| JP | 2009-004371 | 1/2009 |
| JP | 2012-089342 | 5/2012 |
| WO | WO 02/27823 A1 | 4/2002 |
| WO | WO 03/07735 A1 | 9/2003 |
| WO | WO 2009/096335 * | 8/2009 |
| WO | 2009/124431 A1 | 10/2009 |
| WO | 2010/046629 A1 | 4/2010 |
| WO | WO 2010/134579 | 11/2010 |

OTHER PUBLICATIONS

Office Action issued in U.S. Appl. No. 13/275,858 dated Sep. 26, 2013.

International Search Report for PCT/JP2011/062599 dated Aug. 30, 2011.

Gaberseck et al., "Mass and Charge Transport in Hierarchically Organized Storage Materials," Example: Porous Active Materials with Nanocoated Walls of Pores, Solid State !conics, vol. 77, No. 35-36, 2006, pp. 3015-3022.

Wang et al., "A Sudy of LiFePO$_4$ and its Doped Derivatives as Cathode Materials for Lithium-Ion Batters," Journal of Power Sources, 2006, vol. 159, No. 1, pp. 282-286.

Zhao et al., "Dissipative Particle Dynamics Simulation of Physical Gelation Behavior of P123(PEO20-PPO70-PEO20) Block Copolymer Aqueous Solution", Chemical Journal of Chinese Universities, vol. 30, No. 12 (2009)2455-2459.

Deng et al, "Effect of Mn Substitution on the Structural, Morphological and Electrochemical Behaviors of $Li_2Fe_{1-x}Mn_xSiO_4$ Synthesized via Critic Acid Assisted sol-gel Method", Journal of Alloys and Compounds, 487 (2009) L18-L 23.

Office Action mailed Nov. 7, 2013 in U.S. Appl. No. 13/701,273.

* cited by examiner

METHOD FOR PRODUCING POSITIVE ELECTRODE ACTIVE SUBSTANCE, AND USE OF SAID ACTIVE SUBSTANCE

This application claims priority to JP Patent Application No. 2011-092253 filed 18 Apr. 2011, the entire contents of each of which are hereby incorporated by reference.

BACKGROUND OF THE INVENTION

1. Field of the Invention

The present invention relates to a method for producing a positive electrode active substance, and use of said active substance. More particularly, the present invention relates to a method for producing a positive electrode active substance that gives a non-aqueous electrolyte secondary battery excellent in cycle characteristics, the positive electrode active substance, a positive electrode and a non-aqueous electrolyte secondary battery.

2. Description of the Related Art

As a non-aqueous electrolyte secondary battery, a lithium secondary battery is put into practical use and is widely prevalent. Further, in recent years, the lithium secondary battery is attracting people's attention not only as a small one for a portable electronic apparatus but also as a large-capacity device for being mounted on a vehicle or for electric power storage. For this reason, there is an enhanced demand for safety, cost reduction, long lifetime and the like.

The lithium secondary battery has a positive electrode, a negative electrode, an electrolytic solution, a separator and an outer cladding material as principal constituent elements. Also, the above positive electrode is constituted of a positive electrode active substance, an electroconductive material, a collector and a binder (binding agent).

Generally, as the positive electrode active substance, a layered transition metal oxide such as represented by lithium cobaltate ($LiCoO_2$) is used. However, the layered transition metal oxide is liable to provoke oxygen elimination in a fully charged state at a comparatively low temperature around 150° C. The oxygen elimination induces thermal bursting reaction of the battery. Therefore, when the battery having lithium cobaltate is used in the portable electronic apparatus, there is a fear that heat generation, fire catching and the like may occur.

For this reason, a lithium-containing composite oxide, for example, lithium iron phosphate ($LiFePO_4$), having a stable structure that does not release oxygen at an abnormal time and having an olivine structure safer than $LiCoO_2$ is expected as the positive electrode active substance. Since lithium iron phosphate does not contain cobalt which has a low degree of presence in the earth crust, lithium iron phosphate also has an advantage of being comparatively less expensive. Also, lithium iron phosphate has an advantage of being more stable in structure than the layered transition metal oxide.

However, when lithium iron phosphate is used as the positive electrode active substance, decrease in the discharging capacity accompanying a repetition of charging and discharging is large, thereby raising a problem of short lifetime of the obtained battery. Regarding lithium iron phosphate, expansion or contraction of the positive electrode active substance caused by intercalation and deintercalation of Li in charging and discharging is large. For this reason, when the number of cycles increases, the positive electrode active substance physically drops off gradually from a collector or a conductive material. By dropping off, the structure of the positive electrode active substance is destroyed, and an active substance that does not contribute to charging and discharging increases. As a result of this, decrease in the discharging capacity occurs, and the lifetime of the battery will be short. In order to cope with this, a method of restraining the expansion and contraction of the positive electrode active substance by using, as the positive electrode active substance, a lithium-containing composite oxide obtained by the solid phase method and prepared by using lithium iron phosphate as a basic structure and performing element substitution is now studied (for example, Patent Document 1: Japanese Unexamined Patent Publication No. 2002-198050 and Patent Document 2: Japanese Unexamined Patent Publication No. 2005-519451).

SUMMARY OF THE INVENTION

Thus, according to the present invention, there is provided a method of producing a positive electrode active substance comprising steps of:

dissolving a lithium source, an M source, a phosphorus source and an X source in amounts needed to form a lithium-containing composite oxide having an olivine structure and represented by the following general formula (1):

$$Li_xM_yP_{1-z}X_zO_4 \qquad (1)$$

wherein, in the formula, M is at least one kind of element selected from the group of Fe, Ni, Mn, Zr, Sn, Ti, Nb, V, Al and Y; X is at least one kind selected from the group of Si and Al; $0<x\leq2$; $0.8\leq y\leq1.2$; and $0\leq z\leq1$, in a solvent being capable to dissolve these sources, thereby forming a solution;

gelating the obtained solution by adding a cyclic ether compound and sintering the resulting gel to obtain the positive electrode active substance made of the lithium-containing composite oxide having an olivine structure that is covered with carbon deriving from the cyclic ether compound.

Further, according to the present invention, there is provided a positive electrode containing the above-described positive electrode active substance, a conductive material and a binder.

Also, there is a provided a non-aqueous electrolyte secondary battery having the above-described positive electrode, a negative electrode, an electrolyte and a separator.

DETAILED DESCRIPTION OF THE PREFERRED EMBODIMENTS

Figure 1:
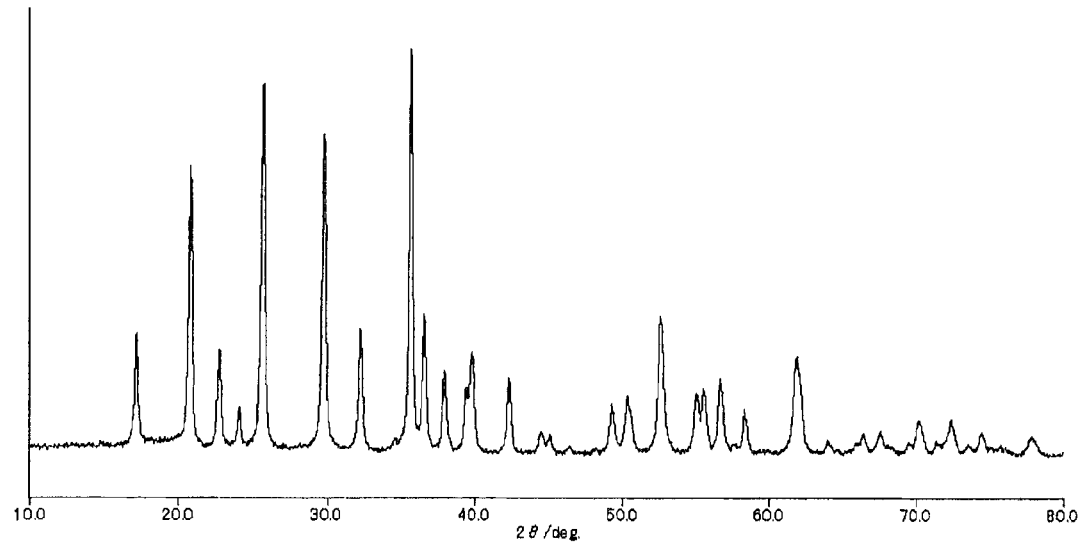
FIG. 1 is a powder X-ray diffraction pattern of the positive electrode active substance of Example 1 in accordance with the present invention.
Figure 2:
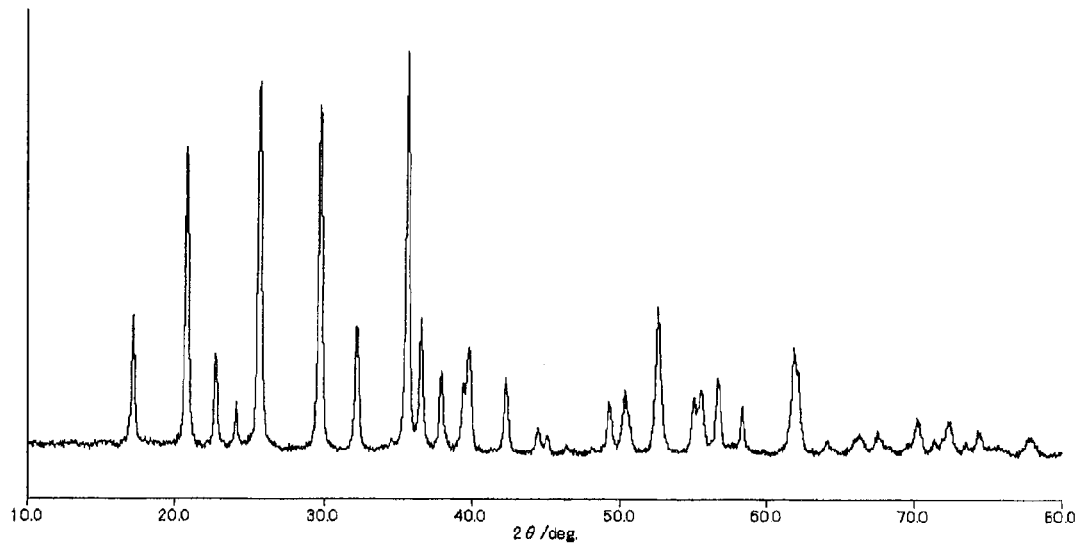
FIG. 2 is a powder X-ray diffraction pattern of the positive electrode active substance of Example 2 in accordance with the present invention.
Figure 3:
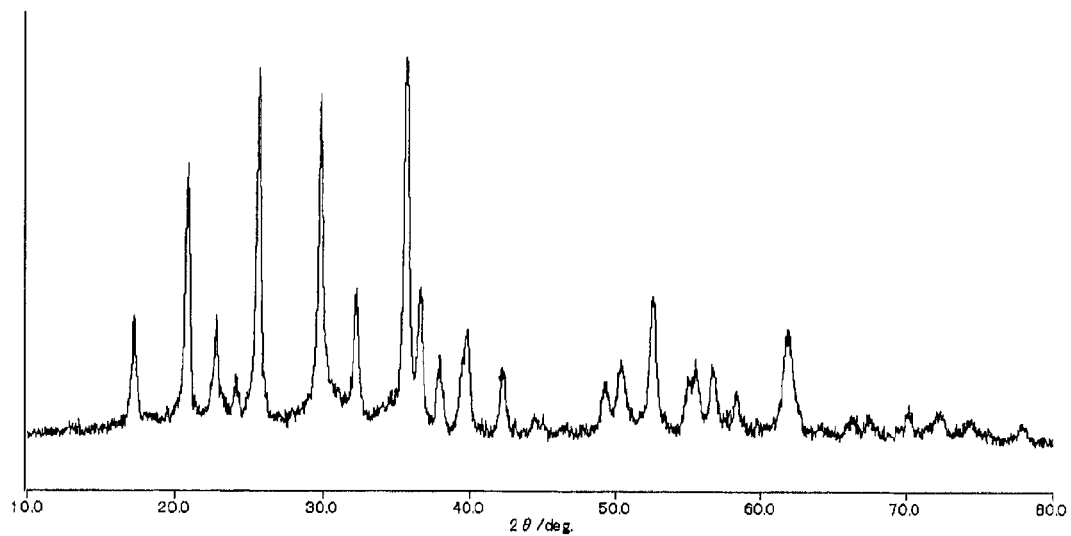
FIG. 3 is a powder X-ray diffraction pattern of the positive electrode active substance of Example 3 in accordance with the present invention.
Figure 4:
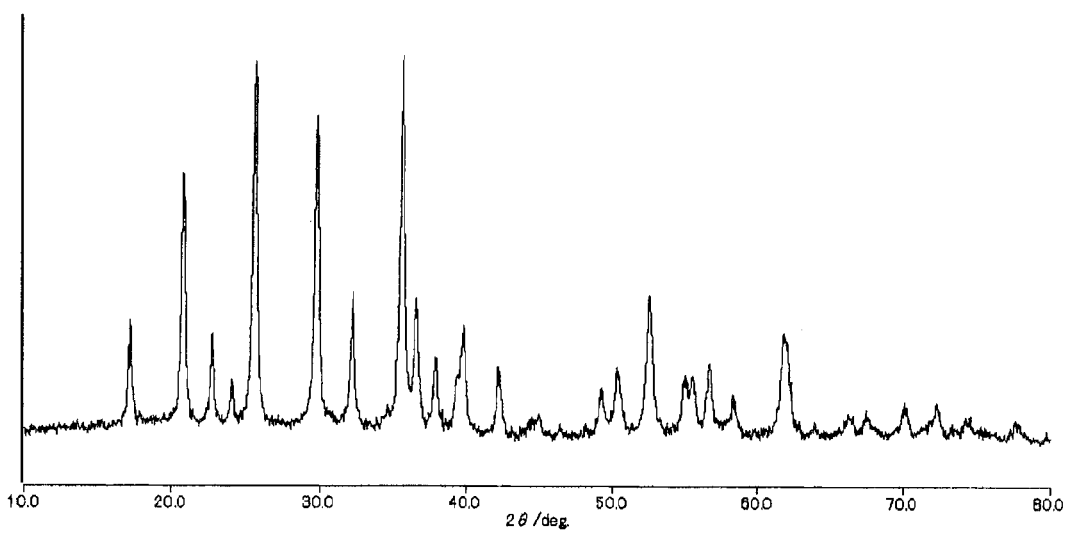
FIG. 4 is a powder X-ray diffraction pattern of the positive electrode active substance of Example 4 in accordance with the present invention.
Figure 5:
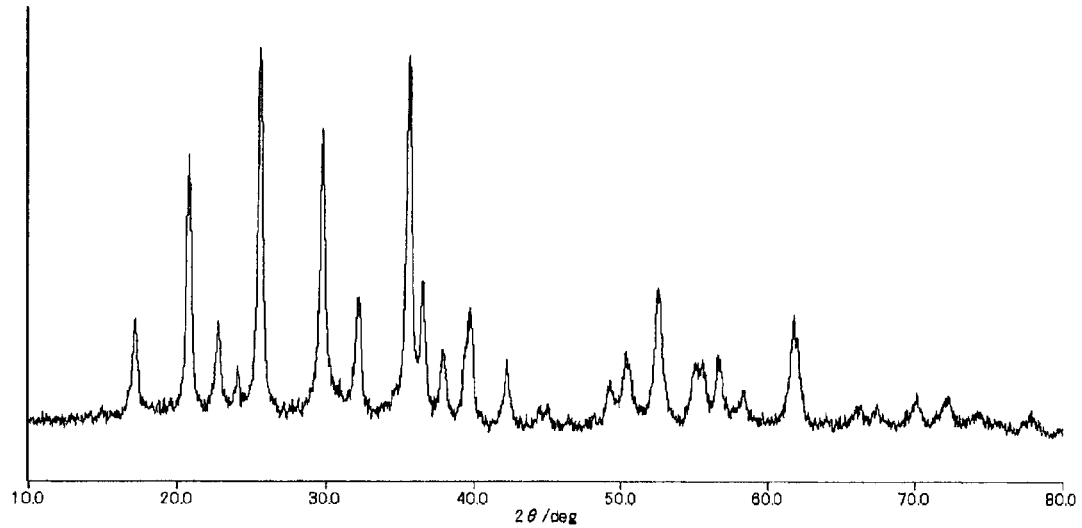
FIG. 5 is a powder X-ray diffraction pattern of the positive electrode active substance of Example 5 in accordance with the present invention.
Figure 6:
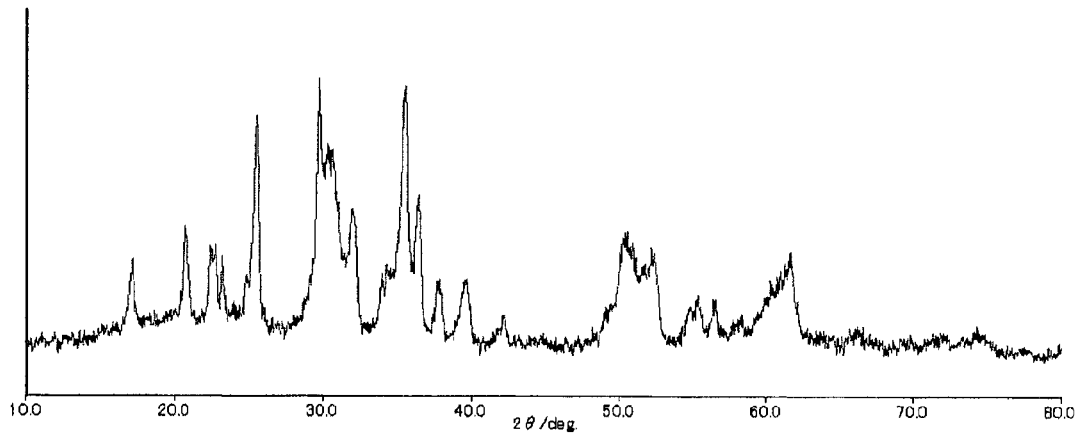
FIG. 6 is a powder X-ray diffraction pattern of the positive electrode active substance of Comparative Example 1.

By the solid phase method of Patent Document 1 or 2, as an impurity is liable to be produced, making it difficult to produce a lithium-containing composite oxide having an olivine structure of a single phase has a problem. Also, by the solid phase method, the lithium-containing composite oxide obtained by sintering is agglomerated, so that the particle size thereof needs to be controlled by crushing. However, the lithium-containing composite oxide raises a problem of decrease in the capacity because the crystallinity lowers by crushing.

For this reason, a method that can produce a lithium-containing composite oxide having an olivine structure of a single phase and can control the particle size without lowering the crystallinity of the lithium-containing composite oxide is demanded.

During the process of eager studies on the method of producing a lithium-containing composite oxide having an olivine structure, the inventors of the present invention have found out that a lithium-containing composite oxide having an olivine structure of a single phase can be obtained while controlling the particle size without lowering the crystallinity by gelating a solution of source materials with a cyclic ether compound and sintering the obtained gel. Also, the inventors have found out that a lifetime of the battery will be improved when a lithium-containing composite oxide in which parts of iron elements and phosphorus elements of $LiFePO_4$ are substituted with other elements is used as the positive electrode active substance.

(I) Lithium-containing Composite Oxide (Positive Electrode Active Substance)

By the production method of the present invention, a positive electrode active substance made of a lithium-containing composite oxide having an olivine structure and represented by the following general formula (1):

$$Li_xM_yP_{1-z}X_zO_4 \quad (1)$$

wherein, in the formula, M is at least one kind of element selected from the group of Fe, Ni, Mn, Zr, Sn, Ti, Nb, V, Al and Y; X is at least one kind selected from the group of Si and Al; $0<x\leq2$; $0.8\leq y\leq1.2$; and $0\leq z\leq1$, is obtained.

Here, x can assume a value of 0.2, 0.4, 0.6, 0.8, 0.9, 1.0, 1.2, 1.4, 1.6, 1.8 or 2.0; y can assume a value of 0.8, 0.9, 1.0, 1.1 or 1.2; and z can assume a value of 0.1, 0.2, 0.3, 0.4, 0.5, 0.6, 0.7, 0.8, 0.9 or 1.0.

In the present invention, the olivine structure refers to a structure represented by a crystal structure of olivine in which oxygen atoms have an approximately hexagonal closest packing structure and the other atoms enter the gap of the hexagonal closest packing structure.

Specific examples of the lithium-containing composite oxide include:
$Li_xFe_yP_{1-z}O_4$ ($0.8\leq x\leq1.2$, $0.8\leq y\leq1.2$, $z=0$),
$Li_xNi_yP_{1-z}O_4$ ($0.8\leq x\leq1.2$, $0.8\leq y\leq1.2$, $z=0$),
$Li_xMn_yP_{1-z}O_4$ ($0.8\leq x\leq1.2$, $0.8\leq y\leq1.2$, $z=0$),
$Li_x(Fe,Ni)_yP_{1-z}O_4$ ($0.8\leq x\leq1.2$, $0.8\leq y\leq1.2$, $z=0$),
$Li_x(Fe,Mn)_yP_{1-z}O_4$ ($0.8\leq x\leq1.2$, $0.8\leq y\leq1.2$, $z=0$),
$Li_x(Fe,Zr)_yP_{1-z}O_4$ ($0.8\leq x\leq1.2$, $0.8\leq y\leq1.2$, $z=0$),
$Li_x(Fe,Sn)_yP_{1-z}O_4$ ($0.8\leq x\leq1.2$, $0.8\leq y\leq1.2$, $z=0$),
$Li_x(Fe,Y)_yP_{1-z}O_4$ ($0.8\leq x\leq1.2$, $0.8\leq y\leq1.2$, $z=0$),
$Li_x(Fe,Ni)_yP_{1-z}Si_zO_4$ ($0.8\leq x\leq1.2$, $0.8\leq y\leq1.2$, $0<z\leq0.5$),
$Li_x(Fe,Mn)_yP_{1-z}Si_zO_4$ ($0.8\leq x\leq1.2$, $0.8\leq y\leq1.2$, $0<z\leq0.5$),
$Li_x(Fe,Zr)_yP_{1-z}Si_zO_4$ ($0.8\leq x\leq1.2$, $0.8\leq y\leq1.2$, $0<z\leq0.5$),
$Li_x(Fe,Sn)_yP_{1-z}Si_zO_4$ ($0.8\leq x\leq1.2$, $0.8\leq y\leq1.2$, $0<z\leq0.5$),
$Li_x(Fe,Y)_yP_{1-z}Si_zO_4$ ($0.8\leq x\leq1.2$, $0.8\leq y\leq1.2$, $0<z\leq0.5$),
$Li_x(Fe,Ti)_yP_{1-z}Si_zO_4$ ($0.8\leq x\leq1.2$, $0.8\leq y\leq1.2$, $0<z\leq0.5$),
$Li_x(Fe,Nb)_yP_{1-z}Si_zO_4$ ($0.8\leq x\leq1.2$, $0.8\leq y\leq1.2$, $0<z\leq0.5$) and
$Li_x(Fe,V)_yP_{1-z}Si_zO_4$ ($0.8\leq x\leq1.2$, $0.8\leq y\leq1.2$, $0<z\leq0.5$).

When M is constituted of a plurality of elements, the value of the atom % of each can assume an arbitrary value within a range larger than 0 atom % and less than 100 atom % with respect to the total amount of M. Specifically, the atom % can assume 10 atom %, 20 atom %, 30 atom %, 40 atom %, 50 atom %, 60 atom %, 70 atom %, 80 atom % or 90 atom %.

From the viewpoint of being used as a positive electrode active substance, particularly preferable examples of the lithium-containing composite oxide includes:
$Li_x(Fe,Zr)_yP_{1-z}Si_zO_4$ ($0.8\leq x\leq1.2$, $0.8\leq y\leq1.2$, $0<z\leq0.5$),
$Li_x(Fe,Sn)_yP_{1-z}Si_zO_4$ ($0.8\leq x\leq1.2$, $0.8\leq y\leq1.2$, $0<z\leq0.5$),
$Li_x(Fe,Y)_yP_{1-z}Si_zO_4$ ($0.8\leq x\leq1.2$, $0.8\leq y\leq1.2$, $0<z\leq0.5$),
$Li_x(Fe,Ti)_yP_{1-z}Si_zO_4$ ($0.8\leq x\leq1.2$, $0.8\leq y\leq1.2$, $0<z\leq0.5$),
$Li_x(Fe,Nb)_yP_{1-z}Si_zO_4$ ($0.8\leq x\leq1.2$, $0.8\leq y\leq1.2$, $0<z\leq0.5$) and
$Li_x(Fe,V)_yP_{1-z}Si_zO_4$ ($0.8\leq x\leq1.2$, $0.8\leq y\leq1.2$, $0<z\leq0.5$).

The lithium-containing composite oxide is generally used in a particulate form. The particle size of the primary particles is preferably 1 μm or less, more preferably 10 nm to 1 μm, in view of enhancing the efficiency of intercalation and deintercalation of lithium ions. A practical lower limit of the particle size of the primary particles is about 10 nm in view of the compatibility between the efficiency of intercalation and deintercalation and the production cost. Here, the particle size of the primary particles can be measured by direct observation by SEM or by a particle size distribution measuring apparatus by the laser diffraction/scattering method.

(2) Method of Producing the Lithium-containing Composite Oxide

The present invention is a method of producing a lithium-containing composite oxide of the above general formula (1) and at least includes a step of dissolving source material substances into a solvent (hereafter referred to as a dissolving step), a step of gelating the obtained solution (hereafter referred to as a gelating step), and a step of sintering the obtained gel (hereafter referred to as a sintering step). Here, a step of removing the solvent from the gel obtained in the gelating step (hereafter referred to as a drying step), a step of crushing the obtained gel to make an average particle size of the gel to be 0.1 to 50 μm (hereafter referred to as a crushing step), and a step of mixing a substance that will be a carbon source with the gel before sintering (hereafter referred to as a carbon source mixing step) can be provided in accordance with the needs.

(i) Dissolving Step

The lithium source, M source, phosphorus source and X source constituting the source material substances are not particularly limited as long as they are compounds capable of forming a solution by being dissolved in a solvent. These compounds are preferably compounds such that 10 mmol or more of the compounds are dissolved into 100 g of water.

(Lithium Source)

The lithium source is not particularly limited as long as it is a compound that can become a source material of the positive electrode active substance of the general formula (1), is soluble in the solvent, and does not inhibit the production method of the present invention. For example, an inorganic salt, hydroxide, organic acid salt and metal alkoxide of lithium, and hydrates of these salts can be used. Specifically, the inorganic salt may be, for example, lithium carbonate ($Li_2CO_3$) which is a salt with a weak acid (hereafter referred to as a weak acid salt), lithium nitrate ($LiNO_3$) or lithium chloride (LiCl) which are a salt with a strong acid (hereafter referred to as a strong acid salt). The hydroxide may be, for example, lithium hydroxide (LiOH). The organic salt may be, for example, lithium acetate ($LiCH_3COO$) or lithium oxalate $(COOLi)_2$, which are a weak acid salt. Also, the metal alkoxide may be, for example, lithium methoxide ($LiOCH_3$), lithium ethoxide ($LiOC_2H_5$), lithium-n-propoxide ($LiO$-n-$C_3H_7$), lithium-i-propoxide ($LiO$-i-$C_3H_7$), lithium-n-butoxide (LiO-n-C$_4$H$_9$), lithium-t-butoxide (LiO-t-C$_4$H$_9$) or lithium-sec-butoxide (LiO-sec-C$_4$H$_9$). The inorganic salt, hydroxide and organic salt may be a hydrate. Among these, a hydroxide, weak acid salt or strong acid salt is preferable in view of facility in preparing a homogeneous solution in an ambient air atmosphere and low costs. Among these, lithium carbonate, lithium hydroxide, lithium chloride, lithium acetate or lithium nitrate is preferable. Here, in the present invention, "homogeneous solution" refers to a state in which production of deposits is not recognized by eye observation and the solution is not separated into two or more phases.

Hereafter, a method of dissolving the lithium source will be described with respect to a case in which iron and zirconium are used as the element M, silicon is used as the element X, and water is used as the solvent.

The amount of water that dissolves the lithium source preferably has a molar number of one time to 100 times, more preferably 4 times to 20 times, as large as the molar number of Li.

Also, the lithium source, iron source, zirconium source and silicon source may be dissolved in any order as long as a homogeneous solution is obtained. After a homogeneous solution obtained from part of the source materials is allowed to react in advance, the remaining source materials may be added. The lithium source is preferably allowed to react with a hydrate of a salt of the iron source in advance. By allowing the lithium source and the hydrate of the salt of the iron source to react in advance, the generation of deposits when phosphoric acid is added can be restrained.

Also, the lithium source is preferably allowed to react with tetramethoxysilane or tetraethoxysilane in advance, and in particular is preferably allowed to react with tetramethoxysilane. The procedure of mixing the materials at the time of this reaction is preferably a procedure in which, after the lithium source is dissolved into water, ethanol is added, and tetramethoxysilane or tetraethoxysilane is added. After these are mixed, the mixture may be heated to 30 to 60° C. to promote the reaction further. The period for heating is not particularly limited; however, a period of about 30 minutes to 12 hours is suitable. By allowing the lithium source and the silicon source to react in advance, generation of an impurity after sintering or substitution of the Li site with Fe in the lithium composite oxide can be restrained.

(M Source)

The M source is not particularly limited as long as it is a compound that can become a source material of the positive electrode active substance of the general formula (1), is soluble in the solvent, and does not inhibit the production method of the present invention. For example, an inorganic salt, hydroxide, organic acid salt and metal alkoxide of the element M, and hydrates of these salts can be used. As described above, M is at least one kind of element selected from the group of Fe, Ni, Mn, Zr, Sn, Ti, Nb, V, Al and Y, and preferably includes at least Fe. For example, as the iron source, the inorganic salt may be, for example, iron (II) carbonate (Fe(CO$_3$)) which is a weak acid salt, iron (II) nitrate (Fe(NO$_3$)$_2$), iron (III) nitrate (Fe(NO$_3$)$_3$), iron (II) chloride (FeCl$_2$), iron (III) chloride (FeCl$_3$), iron (II) sulfate (FeSO$_4$) or iron (III) sulfate (Fe$_2$(SO$_4$)$_3$) which are a strong acid salt. Also, the organic salt may be, for example, iron (II) oxalate (FeC$_2$O$_4$), iron (III) oxalate (Fe$_2$(C$_2$O$_4$)$_3$), iron (II) acetate (Fe(CH$_3$COO)$_2$) or iron (III) acetate (Fe(CH$_3$COO)$_3$), which are a weak acid salt. A hydrate of iron (III) nitrate, iron (II) chloride, iron (III) chloride or iron (II) sulfate is preferable. Also, in view of developing a sufficient network at the time of gelation, iron (III) nitrate or iron (III) chloride having a valence number of three is more preferable.

M preferably includes zirconium. For example, as the zirconium source, the inorganic salt may be zirconium chloride (ZrCl$_4$), zirconium bromide (ZrBr$_4$), zirconium iodide (ZrI$_4$) which are a zirconium halogen compound, zirconium oxychloride (ZrOCl$_2$), zirconium oxynitrate (ZrO(NO$_3$)$_2$) or zirconium oxyacetate (ZrO(CH$_3$COO)$_2$) which are an oxyzirconium salt. Also, the metal alkoxide may be, for example, zirconium methoxide (Zr(OCH$_3$)$_4$), zirconium ethoxide (Zr(OC$_2$H$_5$)$_4$), zirconium-n-propoxide (Zr(O-n-C$_3$H$_7$)$_4$), zirconium-i-propoxide (Zr(O-t-C$_3$H$_7$)$_4$), zirconium-n-butoxide (Zr(O-n-C$_4$H$_8$)$_4$), zirconium-t-butoxide (Zr(O-t-C$_4$H$_8$)$_4$) or zirconium-sec-butoxide (Zr(O-sec-C$_4$H$_8$)$_4$). Among these, zirconium oxychloride (ZrOCl$_2$), zirconium oxynitrate (ZrO(NO$_3$)$_2$) or zirconium oxyacetate (ZrO(CH$_3$COO)$_2$) which are an oxyzirconium salt is preferable in view of low costs.

Hereafter, a method of dissolving the M source will be described with respect to a case in which iron and zirconium are used as the element M, silicon is used as the element X, and water is used as the solvent.

The iron source, lithium source, zirconium source and silicon source may be dissolved in any order as long as a homogeneous solution can be obtained. After a homogeneous solution obtained from part of the source materials is allowed to react in advance, the remaining source materials may be added. The iron source is preferably added into the solvent before phosphoric acid. By allowing only the iron source to react in advance, production of an impurity after sintering can be restrained. For this reason, the iron source may be allowed to react in advance by dissolving only the iron source into water and thereafter heating to such a degree that a deposit may not be produced.

The zirconium source (for example, oxyzirconium salt), lithium source, iron source and silicon source may be dissolved in any order as long as a homogeneous solution can be obtained. The oxyzirconium salt and the iron source are preferably allowed to react in advance. By allowing the oxyzirconium salt and the iron source to react in advance, forming of an impurity such as zirconia or zirconium phosphate after sintering can be restrained. Also, the oxyzirconium salt is preferably allowed to react with tetramethoxysilane or tetraethoxysilane in advance, and in particular is preferably allowed to react with tetramethoxysilane. By allowing the oxyzirconium salt and the silicon source to react in advance, generation of an impurity after sintering or substitution of the Li site with Fe in the lithium composite oxide can be restrained.

(Phosphorus Source)

A substance that will be the phosphorus source is not particularly limited as long as it is a compound that can become a source material of the positive electrode active substance of the general formula (1), is soluble in the solvent, and does not inhibit the production method of the present invention. Specifically, the substance may be, for example, phosphoric acid (H$_3$PO$_4$), ammonium hydrogenphosphate ((NH$_4$)$_2$HPO$_4$) or ammonium dihydrogenphosphate (NH$_4$H$_2$PO$_4$). Among these, phosphoric acid is preferable.

Hereafter, a method of dissolving the phosphorus source will be described with respect to a case in which iron and zirconium are used as the element M, silicon is used as the element X, and water is used as the solvent.

Phosphoric acid is preferably introduced at least after the lithium source, the iron source and the zirconium source are dissolved. This is because, when phosphoric acid is mixed with the lithium source or zirconium source, a deposit may be generated. In adding phosphoric acid, phosphoric acid may be added in an excessive amount. By adding phosphoric acid in an excessive amount, generation of an impurity after sintering or substitution of the Li site with Fe in the lithium composite oxide can be restrained. In the case of adding phosphoric acid in an excessive amount, phosphoric acid can be added in an excessive amount preferably within a range of 5 to 20 wt %, more preferably within a range of 5 to 15 wt %, with respect to a stoichiometric ratio of phosphoric acid.

(X Source)

The X source is not particularly limited as long as it is a compound that can become a source material of the positive electrode active substance of the general formula (1), is soluble in the solvent, and does not inhibit the production method of the present invention. A metal alkoxide of the element X can be used. X is at least one kind of element selected from the group of Si and Al, and is preferably Si. For example, the silicon source may be one of various silicon alkoxides such as tetraethoxysilane ($Si(OC_2H_5)_4$), tetramethoxysilane ($Si(OCH_3)_4$), methyltriethoxysilane ($CH_3Si(OC_2H_5)_3$), methyltrimethoxysilane ($CH_3Si(OCH_3)_3$), ethyltrimethoxysilane ($C_2H_5Si(OCH_3)_3$) and ethyltriethoxysilane ($C_2H_5Si(OC_2H_5)_3$). Tetraethoxysilane or tetramethoxysilane is preferable.

Hereafter, a method of dissolving the X source will be described with respect to a case in which iron and zirconium are used as the element M, silicon is used as the element X, and water is used as the solvent.

The X source (for example, silicon alkoxide), lithium source, iron source and zirconium source may be dissolved in any order as long as a homogeneous solution can be obtained. In order to promote reaction of silicon alkoxide, methanol or ethanol may be added to water. The amount of methanol or ethanol to be added preferably has a molar number of one time to 100 times, more preferably 2 times to 20 times, as large as the molar number of silicon. By adding methanol or ethanol, affinity with water increases, and the hydrolysis reaction can be promoted. Silicon alkoxide may be allowed to react with phosphoric acid in advance. In the case of using tetraethoxysilane, the reaction is preferably carried out at 40 to 80° C., more preferably at 50 to 80° C. In the case of using tetramethoxysilane, the reaction is preferably carried out at 20 to 60° C. In the case of allowing tetramethoxysilane and the lithium source to react, it is preferable that (molar number of Li of the lithium source/molar number of Si of the silicon source)≥2.

(Solvent)

The solvent is not particularly limited as long as the solvent can dissolve the aforesaid source materials and does not inhibit the production method of the present invention. For example, the solvent may be water, an alcohol (for example, a lower alcohol having a carbon number of 1 to 4 such as methanol or ethanol), acetone, acetonitrile, tetrahydrofuran, N,N-dimethylformamide, dimethyl sulfoxide, acetic acid or formic acid. A plurality of these solvents may be mixed in accordance with the needs. Among these, water is preferable in view of being excellent in cost performance, low price, environment property and safety.

Also, the amount of the solvent is not particularly limited as long as it is an amount that can dissolve all of the source materials. However, in consideration of the fact that the size of the synthesizing apparatus is determined in accordance with the amount of the solvent, the amount of the solvent preferably has a molar number of one time to 100 times, more preferably 2 times to 15 times as large as the total molar number of all of the source materials.

(Dissolving Step)

In the dissolving step, there may be a case in which a deposit is generated depending on the order of dissolving the source materials, and a homogeneous solution cannot be obtained. For this reason, the order of dissolving the source materials will be important.

Hereafter, description will be given on a case in which iron and zirconium are used as the element M and silicon is used as the element X. As described before, a deposit may be generated when phosphoric acid is mixed with the lithium source and the zirconium source. On the other hand, zirconium ions are stabilized by the presence of iron ions. For this reason, it is preferable to dissolve the phosphorus source into a solution in which at least the lithium source, iron source and zirconium source are dissolved. The silicon source may be dissolved before the phosphorus source is dissolved, or may be dissolved after the phosphorus source is dissolved.

Here, in the present invention, the order of dissolving the source materials refers to the order of the introduced source materials when the source materials are sequentially introduced into the solvent. Also, when solutions obtained by dissolving a plurality of source material substances into the solvent are prepared in advance and the solutions are mixed, the order means the order of mixing these.

The order of preparing the solutions into which the lithium source, iron source and zirconium source are dissolved is not particularly limited as long as the zirconium ions can be stabilized with the iron ions. A method of stabilizing the zirconium ions with the iron ions may be, for example, a method of dissolving the zirconium source after dissolving the iron source into the solvent, a method of dissolving the iron source after dissolving the zirconium source into the solvent or a method of simultaneously dissolving the iron source and zirconium source into the solvent. Here, the order of dissolving the iron source and zirconium source is not particularly limited, so that either one of the two may be dissolved first, or the two may be dissolved simultaneously.

In dissolving the source materials into the solvent, heating may be carried out so that the temperature will be room temperature (about 25° C.) or above. The heating temperature is preferably 30 to 80° C., more preferably 30 to 60° C.

Here, in the above description of the dissolving step, an example has been described in which iron and zirconium are used as the element M and silicon is used as the element X. However, the combination is not particularly limited as long as it is a combination of the elements M and X contained in the above general formula (1) that can dissolve all of the source materials homogeneously into the solvent.

(ii) Gelating Step

In the gelating step, the solution obtained in the dissolving step is gelated.

The inventors consider that the gelation is carried out in such a manner that Li, the elements M, P and the element X form a group of assemblies that are bonded via oxygen atoms, and these assemblies are deposited as fine particles having a particle size of several nm (for example, 5, 6 nm) to several ten nm (for example, 50, 60 nm) whereby the viscosity of the solution rises.

In order to carry out the gelation, a cyclic ether compound is preferably added into the solution. A gelation method may be carried out in a state in which the solution stands quietly or in a state in which the solution is stirred.

The cyclic ether compound is not particularly limited as long as the solution can be gelated. For example, the cyclic ether compound may be an ether compound having an ethylene oxide structure (epoxy structure) or a trimethylene oxide structure (oxetane structure) in the structure thereof. Specifically, at least one kind selected from the group of ethylene oxide, propylene oxide, trimethylene oxide, cis-2,3-epoxybutane, 1,2-epoxybutane, glycidol, epichlorohydrin, epifluorohydrin, epibromohydrin and 3,3-dimethyloxetane can be used. Among these cyclic ether compounds, propylene oxide is preferable in view of producing a homogeneous gel and being less expensive. The amount of adding the cyclic ether compound is not particularly limited as long as it is an amount that can gelate the solution. For example, a molar number of one time to 100 times as large as the total molar number of all of the source materials is preferable. By setting the amount to be within this range, each source material can be more homogeneously dispersed into the gel, and further the cyclic ether compound can be made to be a source of carbon that covers the particle surface. Also, a solution to which a cyclic ether compound has been added may be heated in accordance with the needs.

(iii) Drying Step

The remaining solvent may be removed from the gel. As a method of removing the solvent, a method of leaving the gel to stand quietly at room temperature, a method of removing the solvent by heating to 30 to 100° C., a method of placing the gel in a chamber using a rotary pump or the like and removing the solvent by reducing the pressure or the like method can be used. Also, the solvent may be removed by the same method as described above after performing solvent exchange with a solvent having a higher volatility or a solvent having a different surface tension than the solvent used at the time of preparing the solution. The solvent to be used for solvent exchange may be, for example, toluene, benzene, hexane, tetrahydrofuran, isopropanol or a mixed solvent of these. Also, the solvent can be removed as well by immersing the gel obtained in the present step into carbon dioxide in a supercritical state and extracting the solvent.

(iv) Crushing Step

The size of secondary particles may be controlled by mechanically crushing the obtained gel. A crushing method is not particularly limited. Also, heating, cooling and atmosphere controlling may be carried out in accordance with the needs.

Examples of the crushing method include a planetary ball mill, a ball mill, a beads mill, a vibration mill, a pin mill, an atomizer, a homogenizer, a rotary mill, a roller mill, a hammer mill and a jet mill; however, the method is not limited to these.

The average particle size of the crushed gel is preferably 0.1 μm to 50 μm, more preferably 0.2 μm to 10 μm. When the size is larger than 50 μm, reduction at the time of sintering will be insufficient whereby an impurity such as $Fe_2O_3$ or $ZrO_2$ will be liable to be generated. Also, when the size is smaller than 0.1 μm, the surface area will be large, so that an impurity will be liable to be generated because of reaction with moisture in air or adsorption of carbon dioxide or the like. In addition, it will take a long period to crush the gel to this average particle size, so that it is not practical.

The average particle size of the crushed gel can be measured by the following method.

Specifically, about 1 mg of the crushed gel is dispersed on a flat glass plate and is set in a BX60M optical microscope manufactured by Olympus Co., Ltd., and an image of the particles of the gel is captured into a personal computer through a CCD camera. The field of view of the image is cut out to a region having a longitudinal size of 100 μm and a lateral size of 200 μm, and a contour of each particle is extracted by adjusting a threshold value on the contrast of the image. On the basis of the data of this contour, an average value of the longer diameter and the shorter diameter of each particle is determined as a particle size of individual particles. Similar calculation is carried out for all of the particles within the region, and a distribution of the particle size of the particles within the region is determined. The same operation is carried out for 10 times by changing the region of the image to be measured, and the total distributions are accumulated. On the basis of the distribution of the accumulated particle sizes, the area of the particle size from the smaller particle size is accumulated, and the diameter of the particle at the point at which 50% of the total area is attained is defined as the average particle size (hereafter referred to as D50) of the gel.

(v) Carbon Source Mixing Step

Sugars, oils and fats, and synthetic resin materials may be mixed with the crushed gel or the gel that has not been crushed yet. These compounds are carbonized at the time of sintering to form a carbon cover on a surface of the lithium-containing composite oxide, whereby the conductivity of the positive electrode active substance can be improved. The covering with carbon may be on the entire surface or on a part of the surface; however, it is preferable that the entire surface is uniformly covered in order to obtain good electrode characteristics. Here, "uniform" means a state in which the thickness of carbon covering the positive electrode active substance is constant. This state can be confirmed by a transmission electron microscope.

As the sugars, sucrose, fructose and the like can be used. Also, as the synthetic resin materials, polyethers such as polyethylene glycol and polypropylene glycol, polyvinyl alcohol, polyacrylamide, carboxymethyl cellulose, polyvinyl acetate and the like can be used.

(vi) Sintering Step

By sintering the obtained gel, a lithium-containing composite oxide having an olivine structure that is covered with carbon deriving from the cyclic ether compound can be obtained. The sintering can be carried out in one to 24 hours preferably within a temperature range of 400 to 700° C., more preferably 400 to 600° C. As an atmosphere for sintering, an inert gas atmosphere (atmosphere of argon, nitrogen, vacuum or the like) or a reducing atmosphere (atmosphere of hydrogen-containing inert gas, carbon monoxide or the like) can be used. In order to perform uniform sintering, the gel may be stirred. When a toxic gas such as $NO_X$, $SO_X$ or chlorine is generated at the time of sintering, the gas may be removed by providing a removing apparatus.

(vii) Other Steps

The obtained lithium-containing composite oxide may be adjusted to have a desired particle size by being subjected to a crushing step and/or a classification step in accordance with the needs.

(viii) Usage

The obtained lithium-containing composite oxide can be used as a positive electrode active substance of a non-aqueous electrolyte secondary battery. The positive electrode active substance may contain other oxides such as $LiCoO_2$, $LiNiO_2$, $LiFeO_2$, $LiMnO_2$, $LiMn_2O_4$, $Li_2MnO_3$, $LiCoPO_4$, $LiNiPO_4$, $LiMnPO_4$ and $LiFePO_4$ in addition to the above lithium-containing composite oxide.

(II) Non-Aqueous Electrolyte Secondary Battery

The non-aqueous electrolyte secondary battery has a positive electrode, a negative electrode, a non-aqueous electrolyte and a separator. Hereafter, each constituent material will be described.

(a) Positive Electrode

The positive electrode contains the positive electrode active substance, an electroconductive material, a binder and a collector. The positive electrode can be produced, for example, by a known method such as applying a slurry obtained by mixing the positive electrode active substance, the electroconductive material and the binder with an organic solvent on the collector. Here, when the obtained lithium-containing composite oxide has a sufficiently high electric conductivity, the conductive material need not necessarily be added.

As the binder (binding agent), polytetrafluoroethylene, polyvinylidene fluoride, polyvinyl chloride, ethylene propylene diene polymer, styrene-butadiene rubber, acrylonitrile-butadiene rubber, fluorine-containing rubber, polyvinyl acetate, polymethyl methacrylate, polyethylene, nitrocellulose and the like can be used. A thickening agent such as carboxymethyl cellulose can be used as well in accordance with the needs.

As the electroconductive agent, acetylene black, carbon, graphite, natural graphite, artificial graphite, needle coke and the like can be used.

As the collector, a foamed (porous) metal having continuous pores, metal formed into a honeycomb shape, a sintered metal, an expanded metal, a non-woven cloth, a plate, a foil, a perforated plate or foil and the like can be used.

As the organic solvent, N-methyl-2-pyrrolidone, toluene, cyclohexane, dimethylformamide, dimethylacetamide, methyl ethyl ketone, methyl acetate, methyl acrylate, diethyltriamine, N,N-dimethylaminopropylamine, ethylene oxide, tetrahydrofuran and the like can be used. In the case of using a water-soluble one as the binder, water also can be used as the solvent.

A thickness of the positive electrode is preferably about 0.01 to 20 mm. When the thickness is too large, the electric conductivity may decreases. When the thickness is too small, the capacity per unit area may decrease. Here, the positive electrode obtained by application and drying may be compressed with use of a roller press in order to enhance a packing density of the positive electrode active substance.

(b) Negative Electrode

The negative electrode can be fabricated by a known method. Specifically, the negative electrode can be fabricated by a method similar to the one described in the method for fabricating the positive electrode. Namely, after a known binder and a known electroconductive material described in the method for fabricating the positive electrode are mixed with a negative electrode active substance, this mixture powder may be molded into a sheet form, and the molded body may be press-bonded onto an electroconductive net (collector) such as stainless steel or copper to obtain the negative electrode. Also, the negative electrode may be fabricated by applying a slurry obtained by mixing the aforementioned mixture powder with a known organic solvent described in the method for fabricating the positive electrode, onto a metal substrate such as copper.

As the negative electrode active substance, a known material can be used. In order to construct a high-energy-density battery, those in which an electric potential at which lithium is intercalated/deintercalated is close to a deposition/dissolution electric potential of metal lithium are preferable. A typical example thereof is a carbon material such as natural or artificial graphite having a particulate form (scale form, bulk form, fiber form, whisker form, spherical form, ground particulate form or the like).

Examples of the artificial graphite include a graphite obtained by graphitization of mesocarbon microbeads, mesophase pitch powder, isotropic pitch powder or the like. Also, graphite particles in which amorphous carbon is allowed to adhere to a surface thereof can be used. Among these, a natural graphite is preferable because it is inexpensive and has the electric potential close to an oxidation reduction electric potential of lithium, so that a high-energy-density battery can be constructed.

Also, a lithium transition metal oxide, a lithium transition metal nitride, a transition metal oxide, silicon and the like can be used as the negative electrode active substance. Among these, $Li_4Ti_5O_{12}$ is more preferable because a flatness of the electric potential is high and also the volume change by charging and discharging is small.

Also, the negative electrode active substances raised above as examples can be mixed in an arbitrary ratio for use.

(c) Non-Aqueous Electrolyte

As the non-aqueous electrolyte, for example, an organic electrolytic solution, a gel-form electrolyte, a polymer solid electrolyte, an inorganic solid electrolyte, a molten salt and the like can be used. After injecting the non-aqueous electrolyte, an opening part of a container of the secondary battery is sealed. Before sealing, energization may be carried out and a produced gas may be removed.

Examples of the organic solvent constituting the organic electrolyte include cyclic carbonates such as propylene carbonate (PC), ethylene carbonate (EC) and butylene carbonate; chain carbonates such as dimethyl carbonate (DMC), diethyl carbonate (DEC), ethyl methyl carbonate and dipropyl carbonate; lactones such as γ-butyrolactone (GBL) and γ-valerolactone; furans such as tetrahydrofuran and 2-methyltetrahydrofuran; ethers such as diethyl ether, 1,2-dimethoxyethane, 1,2-diethoxyethane, ethoxymethoxyethane and dioxane; dimethyl sulfoxide; sulfolane; methylsulfolane; acetonitrile; methyl formate; methyl acetate; and the like. These organic solvents may be used as a mixture of one or more kinds.

Also, cyclic carbonates such as PC, EC and butylene carbonate are suitable as a solvent to be mixed with GBL because of having a high boiling point.

Examples of an electrolyte salt constituting the organic electrolytic solution include lithium salts such as lithium borofluoride ($LiBF_4$), lithium hexafluorophosphate ($LiPF_6$), lithium trifluoromethanesulfonate ($LiCF_3SO_3$), lithium trifluoroacetate ($LiCF_3COO$) and lithium bis(trifluoromethanesulfone)imide ($LiN(CF_3SO_2)_2$). As the electrolyte salt, one or more kinds of these can be mixed for use. A salt concentration of the electrolytic solution is suitably 0.5 to 3 mol/l.

(d) Separator

The separator may be, for example, a porous body, a non-woven cloth or the like. As a material of the separator, those that do not become dissolved or swollen by the above-described organic solvent contained in the electrolyte are preferable. Specific examples thereof include polyester type polymers, polyolefin type polymers (for example, polyethylene, polypropylene), ether type polymers and inorganic materials such as glass.

(e) Other Members

As to the other members such as a battery container, various materials used in a conventionally known non-aqueous electrolyte secondary battery can be used without any particular limitation.

(f) Method of Producing a Non-aqueous Electrolyte Secondary Battery

The non-aqueous electrolyte secondary battery includes, for example, a laminate body made of a positive electrode, a negative electrode and a separator interposed therebetween. The laminate body may have, for example, a stripe-like planar shape. Also, in a case of fabricating a tubular or oblate battery, the laminate may be rounded and wound.

One or a plurality of the laminate bodies are inserted into the battery container. Typically, the positive electrode and the negative electrode are connected to an external electroconductive terminal of the battery. Thereafter, the battery container is sealed so as to shield the positive electrode, the negative electrode and the separator against an ambient air.

A method of sealing in the case of the tubular battery is typically a method of fitting a lid having a packing made of resin into an opening of the battery container and caulking the battery container and the lid. Also, in the case of a prismatic battery, a method of attaching a metallic lid called a sealing plate to an opening part and performing welding can be used. Besides these methods, a method of sealing with use of a binder and a method of fixing with a screw through the intermediary of a gasket can be used. Further, a method of sealing with a laminate film in which a thermoplastic resin is bonded to a metal foil can be used. Here, an opening part for injecting the electrolyte may be provided at the time of sealing. In the case of using an organic electrolytic solution, the organic electrolytic solution may be injected through the opening part thereof, and thereafter, the opening part may be sealed. Before sealing, energization may be carried out and a produced gas may be removed.

EXAMPLES

Hereafter, the present invention will be described in more detail on the basis of Examples; however, the present invention is not limited to the following Examples. Here, for the chemical reagents used in the Examples, analytical grade reagents manufactured by Kishida Chemical Co., Ltd. were used unless specified otherwise.

Example 1

First, 20 g of water as a solvent and 13.125 mmol of $Fe(NO_3)_3 \cdot 9H_2O$ as an iron source were weighed into a sample bottle (tightly closed vessel) and the mixture was stirred until the iron source was completely dissolved into water. After confirming that the iron source had been completely dissolved, 15 mmol of $LiOH \cdot H_2O$ as a lithium source was weighed, 1.875 mmol of $ZrOCl_2 \cdot 8H_2O$ as a zirconium source and 3.750 mmol of $Si(OC_2H_5)_4$ as a silicon source were weighed, and the mixture was stirred until these were completely dissolved into the solvent to form a homogeneous solution. Finally, 11.250 mmol of $H_3PO_4$ (85%) as a phosphorus source was weighed and the mixture was stirred until a homogeneous solution was formed. The molar ratio of the sample was set to be Li:Fe:Zr:P:Si=1:0.875:0.125:0.75:0.25. Thereafter, propylene oxide was gradually added into the solution, whereupon the resultant lost its fluidity to become a gel together with a rise in the temperature of the solution when 11 ml of propylene oxide had been dropwise added.

Subsequently, the sample bottle was covered with a lid to give a tightly closed state, and the obtained solution was left to stand in an ambient atmosphere having a temperature of 60° C. for 24 hours for aging. Thereafter, in an open state, the gel was left to stand in an ambient atmosphere having a temperature of 60° C. for 24 hours to evaporate the solvent. Thereafter, the resultant was sintered at a temperature of 550° C. for 12 hours in a nitrogen atmosphere. The obtained sample will be referred to as A1.

Example 2

First, 20 g of water as a solvent and 15 mmol of $FeCl_3 \cdot 6H_2O$ as an iron source were weighed into a sample bottle and the mixture was stirred until the iron source was completely dissolved into the solvent. After confirming that the iron source had been completely dissolved, 15 mmol of LiCl as a lithium source was weighed, and the mixture was stirred until the lithium source was completely dissolved to form a homogeneous solution. Thereafter, 15 mmol of $H_3PO_4$ (85%) as a phosphorus source was weighed and the mixture was stirred until the phosphorus source was completely dissolved to form a homogeneous solution. The molar ratio of the sample was set to be Li:Fe:P=1:1:1. Thereafter, propylene oxide was gradually added into the solution, whereupon the resultant lost its fluidity to become a gel together with a rise in the temperature of the solution when 4 ml of propylene oxide had been dropwise added.

Subsequently, the sample bottle was covered with a lid to give a tightly closed state, and the obtained solution was left to stand in an ambient atmosphere having a temperature of 60° C. for 24 hours for aging. Thereafter, in an open state, the gel was left to stand in an ambient atmosphere having a temperature of 60° C. for 24 hours to evaporate the solvent. Thereafter, the resultant was sintered at a temperature of 550° C. for 12 hours in a nitrogen atmosphere. The obtained sample will be referred to as A2.

Example 3

First, 20 g of water as a solvent and 11.250 mmol of $Fe(NO_3)_3 \cdot 9H_2O$ as an iron source were weighed into a sample bottle and the mixture was stirred until the iron source was completely dissolved into the solvent. After confirming that the iron source had been completely dissolved, 15 mmol of $LiCH_3COO$ as a lithium source was weighed, 3.750 mmol of $ZrO(CH_3COO)_2$ as a zirconium source and 7.500 mmol of $Si(OCH_3)_4$ as a silicon source were weighed, and the mixture was stirred until these were completely dissolved into the solvent to form a homogeneous solution. Thereafter, 7.500 mmol of $H_3PO_4$ (85%) as a phosphorus source was weighed and the mixture was stirred until the phosphorus source was completely dissolved to form a homogeneous solution. The molar ratio of the sample was set to be Li:Fe:Zr:P:Si=1:0.75:0.25:0.5:0.5. Thereafter, propylene oxide was gradually added into the solution, whereupon the resultant lost its fluidity to become a gel together with a rise in the temperature of the solution when 12 ml of propylene oxide had been dropwise added.

Subsequently, the sample bottle was covered with a lid to give a tightly closed state, and the obtained solution was left to stand in an ambient atmosphere having a temperature of 60° C. for 24 hours for aging. Thereafter, in an open state, the gel was left to stand in an ambient atmosphere having a temperature of 60° C. for 24 hours to evaporate the solvent. The gel obtained in the drying step was crushed to have an average particle size of 23.6 μm with use of a planetary ball mill. As the crushing condition using the planetary ball mill, a zirconia ball of 10 mmφ was used, and the treatment was carried out at a rotation number of 400 rpm for one hour. Thereafter, the resultant was sintered at a temperature of 550° C. for 12 hours in a nitrogen atmosphere. The obtained sample will be referred to as A3.

Example 4

First, 20 g of water as a solvent and 13.500 mmol of $Fe(NO_3)_3 \cdot 9H_2O$ as an iron source were weighed into a sample bottle and the mixture was stirred until the iron source was completely dissolved into the solvent. After confirming that the iron source had been completely dissolved, 15 mmol of $LiCH_3COO$ as a lithium source was weighed, 1.500 mmol of $ZrO(NO_3)_3 \cdot 2H_2O$ as a zirconium source and 3.000 mmol of $Si(OC_2H_5)_4$ as a silicon source were weighed, and the mixture was stirred until these were completely dissolved into the solvent to form a homogeneous solution. Finally, 12.000 mmol of $H_3PO_4$ (85%) as a phosphorus source was weighed and the mixture was stirred until a homogeneous solution was formed. The molar ratio of the sample was set to be Li:Fe:Zr:P:Si=1:0.9:0.1:0.8:0.2. Thereafter, propylene oxide was gradually added into the solution, whereupon the resultant lost its fluidity to become a gel together with a rise in the temperature of the solution when 10 ml of propylene oxide had been dropwise added.

Subsequently, the sample bottle was covered with a lid to give a tightly closed state, and the obtained solution was left to stand in an ambient atmosphere having a temperature of 60° C. for 24 hours to obtain a gel. The obtained gel was left to stand in an ambient atmosphere having a temperature of 60° C. for 24 hours to evaporate the solvent. Thereafter, the resultant was sintered at a temperature of 550° C. for 12 hours in a nitrogen atmosphere. The obtained sample will be referred to as A4.

Example 5

First, 20 g of water as a solvent and 12.000 mmol of $Fe(NO_3)_3.9H_2O$ as an iron source were weighed into a sample bottle and the mixture was stirred until the iron source was completely dissolved into the solvent. After confirming that the iron source had been completely dissolved, 15 mmol of $LiNO_3$ as a lithium source was weighed, 3.000 mmol of $ZrCl_4$ as a zirconium source and 9.000 mmol of $Si(OC_2H_5)_4$ as a silicon source were weighed, and the mixture was stirred until these were completely dissolved into the solvent to form a homogeneous solution. Thereafter, 9.000 mmol of $H_3PO_4$ (85%) as a phosphorus source was weighed and the mixture was stirred until the phosphorus source was completely dissolved to form a homogeneous solution. The molar ratio of the sample was set to be Li:Fe:Zr:P:Si=1:0.8:0.2:0.6:0.4. Thereafter, propylene oxide was gradually added into the solution, whereupon the resultant lost its fluidity to become a gel together with a rise in the temperature of the solution when 15 ml of propylene oxide had been dropwise added.

Subsequently, the sample bottle was covered with a lid to give a tightly closed state, and the obtained solution was left to stand in an ambient atmosphere having a temperature of 60° C. for 24 hours to obtain a brown gel. The obtained gel was left to stand in an ambient atmosphere having a temperature of 60° C. for 24 hours to evaporate the solvent. Thereafter, the resultant was sintered at a temperature of 550° C. for 12 hours in a nitrogen atmosphere. The obtained sample will be referred to as A5.

Comparative Example 1

Into an agate mortar, 15 mmol of lithium carbonate ($Li_2CO_3$) as a lithium source, 13.125 mmol of iron oxalate dihydrate ($FeC_2O_4.2H_2O$) as an iron source, 1.875 mmol of zirconium oxychloride ($ZrOCl_2$) as a zirconium source, 11.250 mmol of ammonium hydrogenphosphate (($NH_4)_2HPO_4$) as a phosphorus source and 3.750 mmol of $SiO_2$ powder as a silicon source were weighed, and the mixture was crushed until the mixture became homogeneous. The molar ratio of the sample was set to be Li:Fe:Zr:P:Si=1:0.875:0.125:0.75:0.25. Further, 0.24 g of sucrose (carbon source) was added, and the source materials were mixed and crushed until the mixture became homogeneous.

Subsequently, the obtained powder was sintered at a temperature of 600° C. for 12 hours in a nitrogen atmosphere. The obtained sample will be referred to as B1. It was confirmed that 2.3 parts by weight of carbon had adhered to the surface of this sample relative to 100 parts by weight of the sample.

(Composition of Positive Electrode Active Substance)

The obtained samples A1 to A5, B1 were each crushed with an agate mortar, and powder X-ray diffraction patterns shown in FIGS. 1 to 6 were respectively obtained by a powder X-ray analysis apparatus (manufactured by Rigaku Co., Ltd., Type: MiniFlex II). A measurement condition was set to be an FT mode such that a range of 2θ would be 10° to 90° with one step being 0.02° and a measurement time per one step being 3 s.

Subsequently, on the obtained powder X-ray diffraction patterns, structural analysis was carried out using "RIETAN-2000" (F. Izumi AND T. Ikeda, Mater. Sci. Forum, 321-324 (2000)198-203), whereby it was confirmed that positive electrode active substances respectively having a composition expected to be produced had been obtained.

(Evaluation of Secondary Battery)

With respect to the obtained samples, a secondary battery was fabricated by the following method.

About 1 g of each of the samples A1 to A5 and B1 was weighed and crushed in an agate mortar, and this was mixed with about 10 wt % of acetylene black as a conductive agent and about 10 wt % of Teflon resin powder as a binding agent. This mixture was dissolved into N-methyl-2-pyrrolidone and made into a slurry form. This was applied onto one surface of an aluminum foil having a thickness of 20 μm by the doctor blade method. The application amount was set to be about 5 mg/cm². After this application film was dried, pressing was carried out to fabricate a positive electrode.

As the negative electrode active substance, a mixture of natural graphite and artificial graphite in a ratio of 90:10 was used. This negative electrode active substance was mixed with about 10 wt % of Teflon resin powder as a binding agent. Further, 10 wt % of acetylene black as a conductive agent was mixed. This mixture was dissolved into N-methyl-2-pyrrolidone to have a slurry form, and this was applied onto one surface of a copper foil having a thickness of 10 μm and dried, followed by pressing to fabricate a negative electrode.

The positive electrode and the negative electrode fabricated as shown above were cut out so that the positive electrode would have a size of an application part of 30 mm×30 mm and the negative electrode would have a size of an application part of 32 mm×32 mm. As electric current introduction terminals of the battery, a tab made of aluminum having a width of 3 mm and a length of 50 mm was welded to the positive electrode, and a tab made of nickel having a width of 3 mm and a length of 50 mm was welded to the negative electrode.

A separator made of porous polyethylene was allowed to intervene between these positive electrode and negative electrode. The obtained laminate body was allowed to intervene between laminate films obtained by bonding a thermoplastic resin onto two sheets of metal foils as a battery outer cladding, and the resultant was sealed by thermally fusing the peripheries. Here, in this laminate, an opening part for electrolyte injection is provided.

Figure 7:
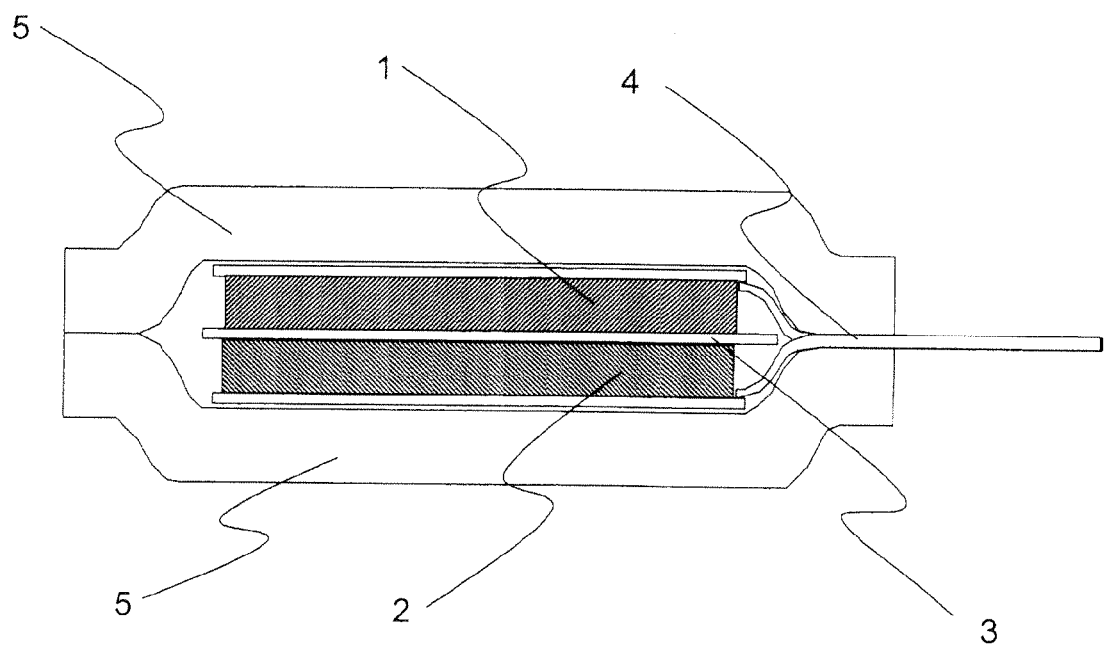
FIG. 7 is a schematic cross-sectional view of the secondary battery.

An electrolytic solution was injected through the opening part. The electrolytic solution contained 33 vol % of ethylene carbonate and 67 vol % of diethyl carbonate as organic solvents. The electrolytic solution dissolved $LiPF_6$ at a concentration of 1 mol/liter and vinylene carbonate at a concentration of 1 wt %. Subsequently, the opening part was sealed to obtain a secondary battery shown in FIG. 7. FIG. 7 is a schematic cross-sectional view of the secondary battery. In FIG. 7, the reference symbol 1 means a positive electrode, 2 means a negative electrode, 3 means a separator, 4 means positive electrode and negative electrode tabs, and 5 means a laminate.

The battery fabricated as shown above was subjected to charging and discharging in an environment of 25° C. The charging current was set to be 1 mA, and the charging was ended at the time point at which the electric potential of the battery reached 3.6 V. After the charging was ended, discharging was carried out at 1 mA, and the discharging was ended at the time point at which the electric potential of the battery reached 2.0 V. Further, the charging and discharging were repeated at an electric current of 1 mA; the discharging capacity at the 100th time was measured; and the capacity maintaining ratio (%) was determined by the following formula:

Capacity maintaining ratio=100th discharging capacity/Initial discharging capacity.

The obtained results are shown in Table 1 together with the materials and the production conditions of the positive electrode active substance.

compared with the solid phase method, the element concentration per unit volume of the gel is lower, so that particles hardly grow at the time of sintering.

Furthermore, when water is used as the solvent, it will be less expensive and gentle to the environment, and has a high safety to the human beings. As described above, the production method of the present invention is excellent in cost performance, environment property and safety, and can provide a positive electrode active substance for a lithium secondary battery capable of elongating the lifetime of the battery.

Also, when the lithium-containing composite oxide is represented by $Li_x(Fe, Zr)_y P_{1-z} O_4$ ($0.8 \leq x \leq 1.2$, $0.8 \leq y \leq 1.2$, $0 \leq z \leq 0.5$), it will be further more excellent in cost performance, environment property and safety, and can provide a positive electrode active substance for a lithium secondary battery capable of elongating the lifetime of the battery.

Further, when the gel before sintering is crushed, the contact area between the gels can be reduced, so that the particle growth accompanying the sintering can be restrained. As a

TABLE 1

|  |  | Ex. 1 | Ex. 2 | Ex. 3 | Ex. 4 | Ex. 5 | Com. Ex. 1 |
|---|---|---|---|---|---|---|---|
| sample |  | A1 | A2 | A3 | A4 | A5 | B1 |
| producing method |  | sol-gel method | | | | | solid phase method |
| material of PEAS ※ | Li source/mole ratio | $LiOH \cdot H_2O$/1.000 | LiCl/1.000 | $LiCH_3COO$/1.000 | $LiCH_3COO$/1.000 | $LiNO_3$/1.000 | $Li_2CO_3$/1.000 |
| | Fe source/1 − x | $Fe(NO_3)_3 \cdot 9H_2O$/0.875 | $FeCl_3 \cdot 6H_2O$/1.000 | $Fe(NO_3)_3 \cdot 9H_2O$/0.750 | $Fe(NO_3)_3 \cdot 9H_2O$/0.900 | $Fe(NO_3)_3 \cdot 9H_2O$/0.800 | $FeC_2O_4 \cdot 2H_2O$/0.875 |
| | Zr source/x | $ZrOCl_2 \cdot 8H_2O$/0.125 | — | $ZrO(CH_3COO)_2$/0.250 | $ZrO(NO_3)_2 \cdot 2H_2O$/0.100 | $ZrCl_4$/2.000 | $ZrOCl_2$/0.125 |
| | P source/1 − y | $H_3PO_4$/0.750 | $H_3PO_4$/1.000 | $H_3PO_4$/0.500 | $H_3PO_4$/0.800 | $H_3PO_4$/0.600 | $(NH_4)_2HPO_4$/0.750 |
| | Si source/y | $Si(OC_2H_5)_4$/0.250 | — | $Si(OCH_3)_4$/0.500 | $Si(OC_2H_5)_4$/0.200 | $Si(OC_2H_5)_4$/0.400 | $SiO_2$/0.250 |
| carbon source | material amount | 11 ml | 4 ml | 12 ml | 10 ml | 15 ml | propylene oxide sucrose 2.5 g |
| solvent | material | | | water | | | — |
| leaving step | atomosphre/tempreture (° C.)/time (hr) | | | ambient/60/24 | | | — |
| evaporate step | atomosphre/tempreture (° C.)/time (hr) | | | ambient/60/24 | | | — |
| sintering step | atomosphre/tempreture (° C.)/time (hr) | | | nitrogen/550/12 | | | nitrogen/600/12 |
| evaluation | Initial discharging capacity (mAh/g) | 116.8 | 138.5 | 98.8 | 121.3 | 112.1 | 16.1 |
| | 100th discharging capacity (mAh/g) | 115.3 | 120.9 | 97.6 | 115.0 | 109.7 | 2.1 |
| | capacity maintaining ratio (%) | 98.7 | 87.3 | 98.8 | 94.8 | 97.9 | 13.0 |

※ The mole ratio of material of the positive electrode active substance (PEAS) corresponds to a mole ratio of material needed to form a positive electrode active substance represented formulae $LiFe_{1-x}M_x P_{1-y} Si_y O$ From the results of Table 1, it will be understood that the non-aqueous electrolyte secondary battery using the samples A1 to A5 obtained by the production method of the present invention as a positive electrode active substance has an initial discharging capacity and a 100th discharging capacity of about 100 mAh/g or more and a capacity maintaining ratio of about 90% or more, thereby having good cycle characteristics.

On the other hand, the non-aqueous electrolyte secondary battery using the sample B1 having a different composition as a positive electrode active substance has an inferior initial discharging capacity, an inferior 100th discharging capacity and an inferior capacity maintaining ratio as compared with the above-described non-aqueous electrolyte secondary battery.

According to the production method of the present invention, the source material elements can be homogeneously dispersed into the gel, so that a lithium-containing composite oxide having an olivine structure of a single phase can be produced by restraining the generation of impurities. Also, as result of this, even if the lithium-containing composite oxide after the sintering is not crushed, the particle size can be controlled by restraining the agglomeration of primary particles and secondary particles. This eliminates the need for crushing after the sintering, so that decrease in the crystallinity of the lithium-containing composite oxide can be restrained.

Cross-Reference to Related Application

This application is related to Japanese application No. 2011-92253 filed on Apr. 18, 2011, whose priority is claimed under 35 USC §119, the disclosure of which is incorporated by reference in its entirety.

What is claimed is:

1. A method of producing a positive electrode active substance comprising steps of:
    dissolving a lithium source, an M source including an iron source comprising as a constituent component Fe having a valence number of three, a phosphorus source and an X source in amounts needed to form a lithium-containing composite oxide having an olivine structure and represented by the following general formula (1):

$$Li_xM_yP_{1-z}X_zO_4 \qquad (1)$$

wherein, in the formula, M is either Fe or Fe and at least one kind of element selected from the group of Ni, Mn, Zr, Sn, Ti, Nb, V, and Y; X is Si; $0<x\le2$; $0.8\le y\le1.2$; and $0\ge z\le0.5$, in a solvent being capable to dissolve these sources, thereby forming a solution;

gelating the obtained solution by adding a cyclic ether compound and sintering the resulting gel to obtain the positive electrode active substance made of the lithium-containing composite oxide having an olivine structure that is covered with carbon deriving from the cyclic ether compound, and wherein the cyclic ether compound is selected from the group consisting of ethylene oxide, propylene oxide, trimethylene oxide, cis-2,3-epoxybutane, 1,2-epoxybutane, glycidol, epichlorohydrin, epifluorohydrin, epibromohydrin, 3,3-dimethyloxetane, and mixtures of thereof.

2. The method of producing a positive electrode active material according to claim 1, wherein the solvent contains water.

3. The method of producing a positive electrode active material according to claim 1, wherein the M is Fe or Fe and Zr and the X is Si in the above general formula (1).

4. The method of producing a positive electrode active material according to claim 1, wherein the lithium-containing composite oxide is represented by $Li_x(Fe, Zr)_yP_{1-z}O_4$ ($0.8\le x\le1.2$, $0.8\le y\le1.2$, $0\le z\le0.5$).

5. The method of producing a positive electrode active material according to claim 1, wherein the gel is crushed beforehand, and then is sintered.

6. The method of producing a positive electrode active material according to claim 2, wherein the lithium source is selected from lithium carbonate, lithium hydroxide, lithium chloride, lithium acetate and lithium nitrate, the M source is selected from iron (III) nitrate hydrate, iron (II) chloride hydrate, iron (III) chloride hydrate, iron (II) sulfate hydrate, zirconium oxychloride, zirconium oxynitrate and zirconium oxyacetate, the phosphorus source is selected from phosphoric acid, ammonium hydrogenphosphate and ammonium dihydrogenphosphate, and the X source is selected from tetraethoxysilane and tetramethoxysilane.

7. The method of producing a positive electrode active material according to claim 1, wherein the phosphorus source is phosphoric acid, the phosphoric acid is added in an excessive amount within a range of 5 to 20 wt % with respect to a stoichiometric ratio of phosphoric acid.

8. The method of producing a positive electrode active material according to claim 1, wherein the phosphorus source is dissolved into a solution in which the lithium source, iron source and zirconium source are dissolved.

9. The method of producing a positive electrode active material according to claim 2, wherein the amount of water that dissolves the lithium source has a molar number of one time to 100 times as large as the molar number of Li.

10. The method of producing a positive electrode active material according to claim 6, wherein the lithium source is allowed to react with tetramethoxysilane or tetraethoxysilane in advance.

11. A positive electrode active substance obtained by the producing method of claim 1.

12. The positive electrode active substance according to claim 11, wherein the positive electrode active substance has the particle size of the primary particles of 10 nm to 1 μm.

13. A positive electrode containing the positive electrode active substance of claim 11 or 12, a conductive material and a binder.

14. A non-aqueous electrolyte secondary battery having the positive electrode of claim 13, a negative electrode, an electrolyte and a separator.

* * * * *